US007670222B2

(12) United States Patent
Rozkin et al.

(10) Patent No.: US 7,670,222 B2

(45) Date of Patent: Mar. 2, 2010

(54) DEVICE FOR AND METHOD OF PROVIDING A POKER GAME

(75) Inventors: Sergiy Rozkin, Toronto (CA); Vladimir Dunaevsky, Toronto (CA)

(73) Assignee: CryptoLogic Inc., Toronto (CA)

(*) Notice: Subject to any disclaimer, the term of this patent is extended or adjusted under 35 U.S.C. 154(b) by 707 days.

(21) Appl. No.: 11/156,524

(22) Filed: Jun. 21, 2005

(65) Prior Publication Data

US 2006/0287033 A1 Dec. 21, 2006

(51) Int. Cl.
*A63F 13/00* (2006.01)

(52) U.S. Cl. .......................................... 463/13; 463/12

(58) Field of Classification Search .................... 463/13
See application file for complete search history.

(56) References Cited

U.S. PATENT DOCUMENTS

| | | | | |
|---|---|---|---|---|
| 5,356,140 | A | 10/1994 | Dabrowski et al. | |
| 5,732,950 | A * | 3/1998 | Moody | 273/292 |
| 5,823,873 | A | 10/1998 | Moody | |
| 6,179,711 | B1 | 1/2001 | Yoseloff | |
| 6,257,979 | B1 * | 7/2001 | Walker et al. | 463/13 |
| 6,592,456 | B2 | 7/2003 | Walker et al. | |
| 6,878,060 | B2 | 4/2005 | Moody | |
| 6,880,827 | B2 | 4/2005 | Stefan | |
| 2001/0023199 | A1 * | 9/2001 | Walker et al. | 463/13 |
| 2006/0019745 | A1 * | 1/2006 | Benbrahim | 463/29 |

* cited by examiner

*Primary Examiner*—John M Hotaling, II
*Assistant Examiner*—Jeffrey Wong
(74) *Attorney, Agent, or Firm*—Bereskin & Parr LLP

(57) ABSTRACT

A device for and method of providing a poker game. In a broad aspect, the method is generally directed to a game in which, in a particular game instance, a hand is initially provided with a plurality of cards from which a user may select cards to be shifted from the hand and replaced with replacement cards. If at least one card is selected to be shifted from the hand by the user, the game is repeated for a subsequent game instance, with the hand initially provided in the subsequent game instance comprising cards corresponding to the cards that were selected to be shifted from the hand. In one exemplary embodiment, the plurality of cards is provided as a sequence of subsets of cards (e.g. five cards provided as a sequence of two initial cards followed by three individually-dealt supplementary cards), and in a particular game instance, the user decides whether or not to shift from the hand each card of a given subset in the sequence before the next subset of cards in the sequence is provided to the user.

11 Claims, 8 Drawing Sheets

DEVICE FOR AND METHOD OF PROVIDING A POKER GAME

FIELD OF THE INVENTION

Embodiments of the invention relate generally to gaming devices, and more particularly to poker games provided for play by users on gaming devices.

BACKGROUND OF THE INVENTION

Poker card games have long been known and widely used. The term "poker" has been generally used to describe variations of card games in which players bet that they hold the highest-ranking hand.

Single-player variations of poker games have also become popular. In one typical single-player variation, a user of a gaming device places a wager to initiate play of a hand. The hand is provided with a number of randomly dealt cards from a deck, and the user may optionally select a number of cards from the hand to be discarded and replaced with replacement cards also dealt from the deck (e.g. a process known as "drawing"). Subsequently, a payout to the user is determined based on the cards in the hand upon completion of the drawing process, typically by comparing the rank of the hand with a payout associated with that rank as identified in a payout table.

The gaming devices upon which such single-player variations of poker games are played may include, for example, video poker machines, computing devices, or other devices. A gaming device may operate as a standalone unit, or it may be coupled to other gaming devices in a network.

It is often desirable for operators of gaming devices to provide users with poker games designed to encourage players to extend their play on the gaming devices.

SUMMARY OF THE INVENTION

Embodiments of the invention relate generally to a device for and method of providing a poker game. In a broad aspect, the method is generally directed to a game in which, in a particular game instance, a hand is initially provided with a plurality of cards from which a user may select cards to be shifted from the hand to a different hand of a subsequent game instance and replaced with replacement cards. When at least one card is selected to be shifted from the hand to the different hand by the user, the game will be repeated for a subsequent game instance, with the different hand initially provided in the subsequent game instance comprising cards corresponding to the cards that were selected to be shifted.

In one embodiment, there is provided a method of providing a poker game for play on a gaming device, wherein hands are provided with cards that are displayed to a user on a display of the gaming device, wherein the method comprises, in one iteration, the steps of: providing a first hand with a plurality of cards; receiving input from the user, wherein the input identifies zero or more of the plurality of cards to be shifted from the first hand; replacing zero or more cards in the first hand, wherein each card to be shifted from the first hand that is identified in the input received at the receiving step is replaced with a replacement card in the first hand; determining a payout based on the cards in the first hand after completion of the replacing step; forming a second hand with the cards to be shifted from the first hand identified in the input received at the receiving step; and performing a subsequent iteration of the steps of the method if the second hand includes at least one card, wherein a new hand, comprising cards corresponding to the cards in the second hand and zero or more additional cards, is provided as the first hand at the providing step of the subsequent iteration.

In another embodiment, there is provided a method of providing a poker game for play on a gaming device, wherein hands are provided with cards that are displayed to a user on a display of the gaming device, wherein the method comprises, in one iteration, the steps of: providing a first hand with a plurality of cards; receiving input from the user, wherein the input identifies zero or more of the plurality of cards to be shifted from the first hand; replacing zero or more cards in the first hand, wherein each card to be shifted from the first hand that is identified in the input received at the receiving step is replaced with a replacement card in the first hand; determining a payout based on the cards in the first hand after completion of the replacing step; forming a second hand with the cards to be shifted from the first hand identified in the input received at the receiving step; and performing a subsequent iteration of the steps of the method if the second hand includes at least one card, wherein a new hand, comprising cards corresponding to the cards in the second hand and zero or more additional cards, is provided as the first hand at the providing step of the subsequent iteration; wherein the plurality of cards are provided to the first hand at the providing step as a sequence of at least one subset of cards, each subset comprising one or more cards, wherein input is received from the user for each subset in the sequence at the receiving step, and wherein any subset in the sequence is provided to the user at the providing step after input is received for the preceding subset in the sequence at the receiving step.

BRIEF DESCRIPTION OF THE DRAWINGS

For a better understanding of these and other embodiments of the invention, and to show more clearly how they may be carried into effect, reference will now be made, by way of example, to the accompanying drawings in which.

DETAILED DESCRIPTION

Embodiments of the invention relate generally to a device and method of providing a poker game for play by a user, and more specifically, in one broad aspect, to a method of providing a casino-style game, such as a video poker game for example, which is based on the processes of dealing cards at random from one or more virtual decks of playing cards to the hands of a player and evaluating the hands in accordance with a set of pre-determined rules. In the specification and in the claims, where the poker game is provided to users of a gaming device, the terms "player" and "user" may be used interchangeably.

In accordance with at least one embodiment, the player of the game seeks to create a winning combination of cards for a currently active hand (i.e. the hand currently being played). The player has the option of shifting cards from the currently active hand to a different hand associated with a subsequent game instance. The latter hand is initially inactive, but becomes the active hand upon completion of the play of the former. Accordingly, a continuous sequence of play is promoted.

Figure 1A:
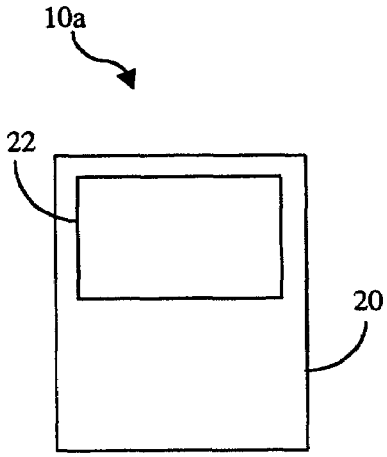
FIGS. 1A-1C are schematic diagrams illustrating a number of example gaming system configurations.
Figure 1B:
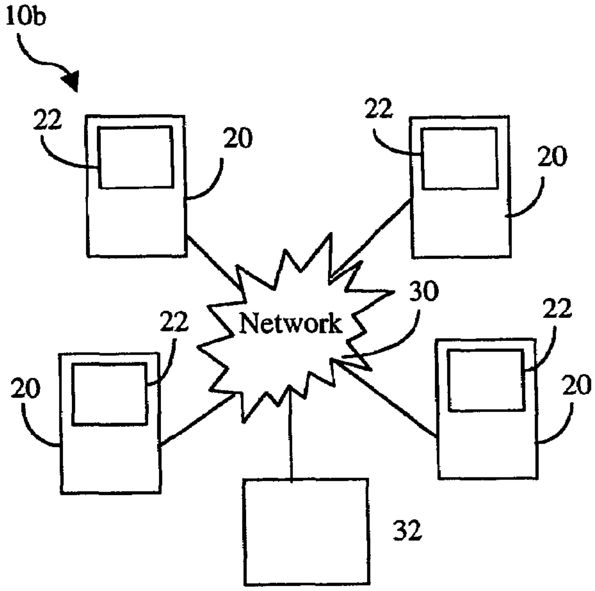
Figure 1C:
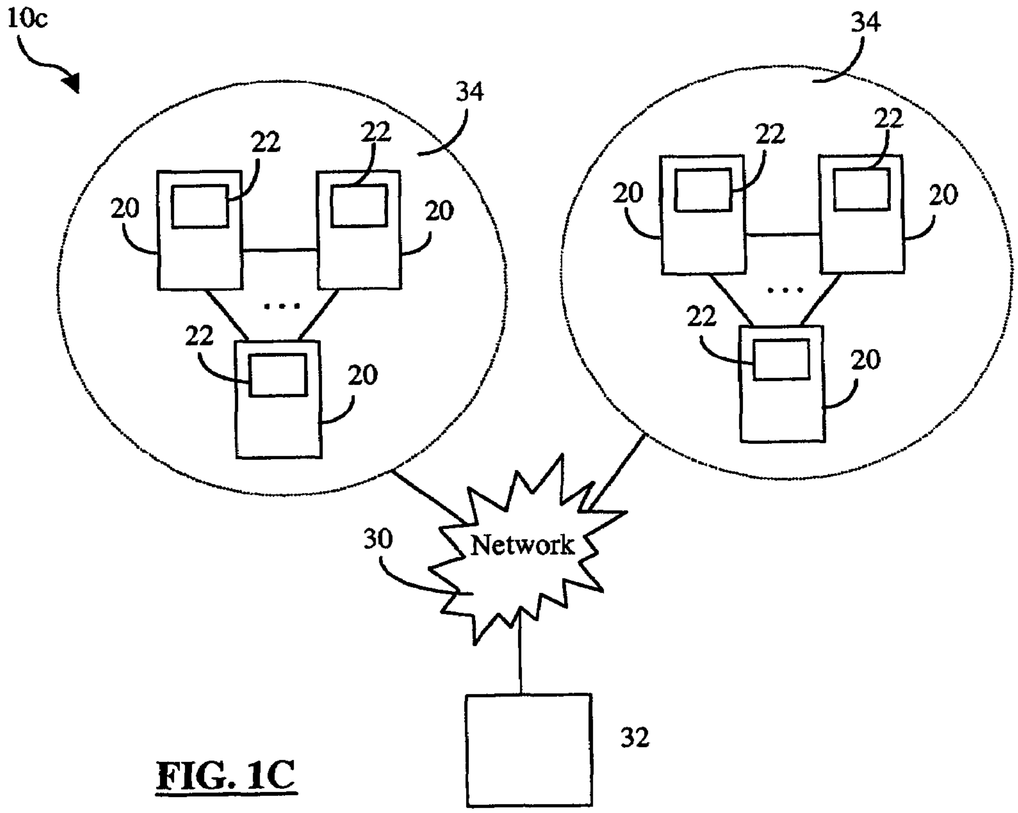

Embodiments of the poker game described herein may be provided in a gaming system for play by users. Referring to FIGS. 1A to 1C, schematic diagrams illustrating a number of example gaming system configurations are provided.

In FIG. 1A, one example configuration in which gaming system 10*a* comprises a single gaming machine or device 20 is shown. Gaming device 20 comprises a display 22, in which poker hands are displayed to users along with other output. Display 22 may also comprise a touch screen adapted to accept input from the user. Images of control buttons (not explicitly shown) may be displayed on the touch screen, and the buttons that are pressed by the user via the touch screen can be detected. Alternatively, gaming device 20 may provide the user with physical control buttons.

It will be understood that gaming device 20 will also include other components not shown in the Figures. For example, where gaming device 20 is a casino gaming machine, a card reader and/or a coin or bill acceptor for receiving wagers may be provided.

In FIG. 1B, another example configuration in which gaming system 10*b* comprises multiple gaming devices 20 (e.g. gaming device 20 of FIG. 1A) within a network 30 is shown. In this example configuration, each gaming device 20 is coupled to a central game server 32 in network 30 that controls a game being provided on that gaming device 20.

In one embodiment, a gaming device 20 and central game server 32 communicate with each other in known manner, to provide the game for play to users. For example, central game server 32 may communicate data representing the states or results of game instances as generated by central game server 32 to gaming device 20. The data is processed by a client application executing on gaming device 20 to display the appropriate output from the game to the user.

Gaming devices 20 in a gaming system (e.g. system 10*b*) may reside in the same physical location (e.g. a casino facility). Alternatively, gaming devices 20 in a gaming system may be distributed across multiple physical locations.

In a further example configuration as shown in FIG. 1C, gaming system 10*c* comprises multiple subnetworks 34 of gaming devices 20, where each subnetwork 34 may be established at a different physical location (e.g. one of a number of casino facilities). The subnetworks 34 are coupled together in a network 30.

With respect to the example configurations shown in FIGS. 1B and 1C, in one embodiment, gaming devices 20 in gaming system 10*b* and/or gaming system 10*c* may form a wide area network, where the gaming devices 20 are personal computers connected together via the Internet, an Intranet, or other network, and monitored by central game server 32. The personal computer may be a desktop computer, a laptop computer, or some other computing device, for example. The client application may be downloaded to the personal computer for execution from a website of a gaming system operator via the Internet, or copied from a compact disc or other medium, for example. Input may be received from the user via a mouse or other input device coupled to the personal computer in known manner.

It will be understood that gaming devices 20 on which methods of providing a poker game can be implemented are not limited to video terminals and computing devices, but may also include, for example, other electro-mechanical machines, interactive televisions, wireless mobile devices, and any other communication devices or gaming devices that comprise a display and processing means, where the processing means is adapted to perform steps for providing a poker game in accordance with an embodiment of a method of the invention. It will be within the capabilities of the person of ordinary skill in the art to implement such methods on any standard microprocessor-based machine or device by means of appropriate programming.

The configurations illustrated in FIGS. 1A to 1C are provided by way of example only, and other configurations of gaming devices 20 are possible in variant implementations. It will be understood that the functions of the central game server 32 may also be provided by one or more gaming devices 20, for example, and need not exist as a separate device.

Figure 2:
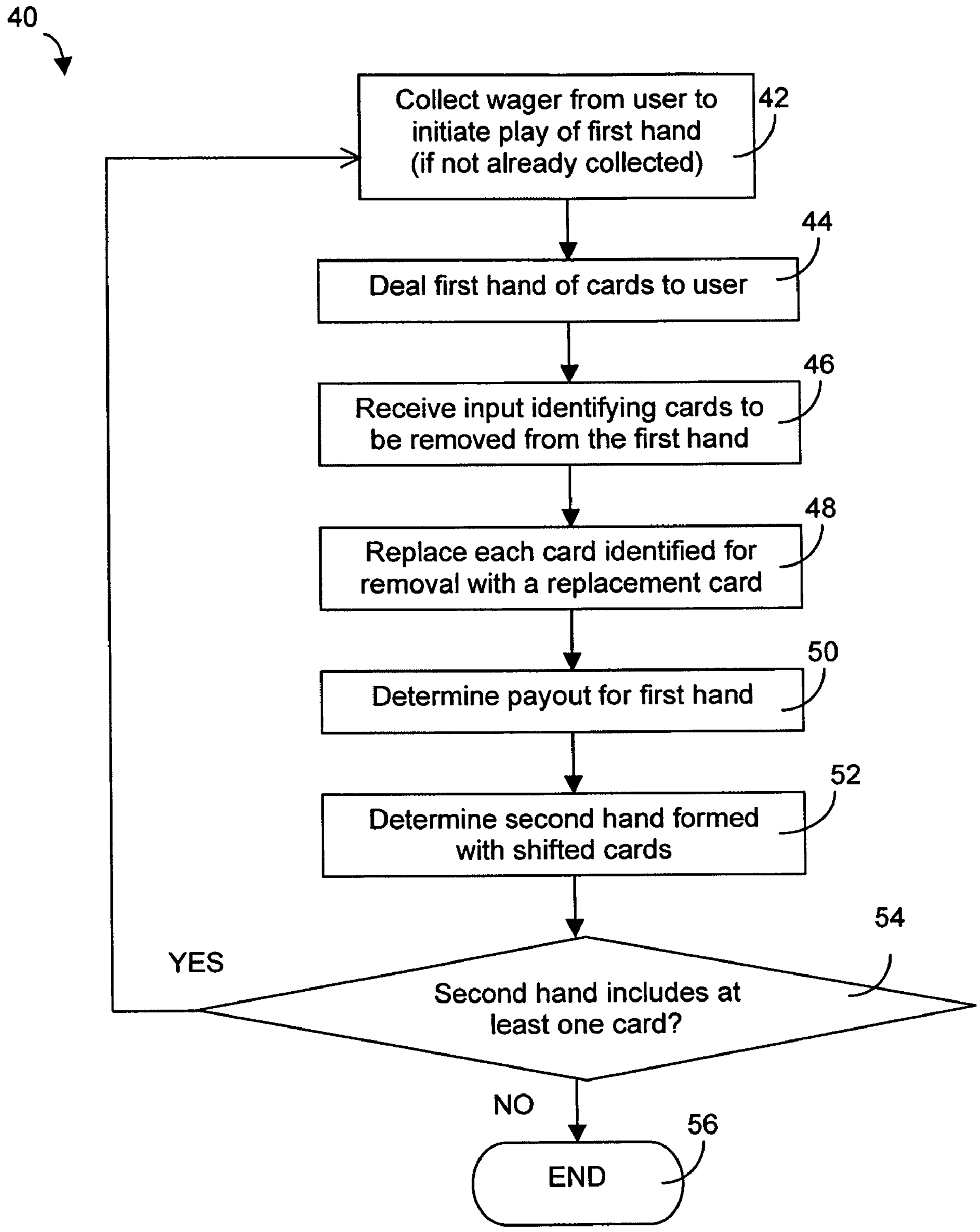
FIG. 2 is a flowchart illustrating steps of a method of providing a poker game in one embodiment.

Referring to FIG. 2, a flowchart illustrating steps of a method of providing a poker game in one embodiment is shown generally as 40.

Method 40 is generally directed to a game in which, in a particular game instance, a hand is initially provided with a plurality of cards. A user of a gaming device may select cards to be shifted from the hand to a different hand associated with a subsequent game instance and replaced with replacement cards. If at least one card has been selected to be shifted from the hand to the different hand by the user in the particular game instance, the game is repeated for the subsequent game instance, with the different hand initially provided in the subsequent game instance comprising cards corresponding to the cards that were selected to be shifted. By allowing users to shift cards in a given hand to a different hand associated with a subsequent game instance, a game that may offer enhanced freedom of choice and creativity from the user's perspective is provided.

In an iteration of method 40, which generally represents a single game instance of the poker game provided, method 40 may comprise some or all of steps 42 to 56 and any other steps relating to various embodiments of method 40 as described below.

At step 42, a wager provided by a user to initiate play of an instance of the poker game is collected from the user on the gaming device. A gaming device may provide means to accept a physical monetary deposit from the user in the form of coins, gaming tokens, paper currency or other currency equivalents, which can then be converted into playing credits. Credits may also be stored on or accessed using a smart card or other card, for example. Other gaming devices permit playing credits to be accrued in other ways, by allowing credits to be purchased through an online payment system, for example. It will be understood by persons skilled in the art that other mechanisms for collecting wagers from a user may also be employed.

At step 44, a first hand of cards is provided ("dealt") to the user. The cards are displayed to the user on a display of the gaming device (e.g. display 22 of gaming device 20 of FIGS. 1A to 1C). The first hand comprises a predetermined number of cards associated with the variation of the game being played. For example, the first hand may comprise five cards where the objective of the poker game is to attain the highest-ranking poker hand using all five cards in the hand. Other variations may require less or more cards to be dealt to the user, and not all of the cards in a hand need be used when determining the rank of the hand.

A virtual deck of playing cards provides the cards that are dealt, at random, to the first hand. Typically, the cards will be dealt from a standard playing card deck, which has cards of four different suits: clubs, spades, hearts and diamonds, with thirteen cards in each suit for a total of 52 cards, as is well known in the art. Decks of cards that are used in the poker game may also provide one or more Jokers and/or special wild cards, with special rules and/or awards that may be associated with the play of such cards in certain implementations. It will be understood by those skilled in the art that other variant decks may be employed in other implementations.

The cards that are displayed to the user at step 44 are considered by the user, who may select certain cards to be removed from the hand to be replaced with replacement cards, generally in an attempt to form the highest ranking hand with which a payout is associated as identified in a predetermined payout table. The cards that a user will select to be removed from the hand may depend on the rules of the particular game being played, and on other factors including game predictions and strategy, for example.

In known draw poker games, selected cards may be removed from the hand by discarding them and replacing them with replacement cards, in a process generally referred to as "drawing". Cards that are not selected to be discarded are typically permitted to remain in the hand (also known as "holding" the card).

However, in accordance with one embodiment, the user may be permitted to not only hold cards and select cards to be removed from a first hand by discarding them, but may also alternatively select cards to be removed from the first hand by shifting them to a second hand (which in this embodiment, remains inactive until play on the first hand is completed) to later be considered in a subsequent game instance. Put another way, in this embodiment, for any given card in the first hand, the user may choose to discard the card, shift the card to a second hand (with the shifted card being removed from the first hand), or hold the card in the hand.

In a variant embodiment, the user may only be provided with an option to shift cards that the user does not wish to hold, and is not permitted to discard cards.

At step 46, if the user opts to remove at least one card from the first hand to be replaced by replacement cards, input identifying the cards for removal from the first hand dealt at step 44 as selected by the user is received. The input identifies the cards to be shifted from the first hand to a second hand. The input may also identify cards to be discarded from the first hand. The input may also explicitly identify cards to be held in the first hand, or alternatively, any cards not explicitly identified for removal from the first hand may be deemed to be held in the first hand.

At step 48, each card identified for removal from the first hand at step 46, if any, is replaced with a replacement card randomly drawn from the deck in the first hand. In particular, each card to be shifted from the first hand as identified in the input received at step 46 is replaced with a replacement card in the first hand. Each card to be discarded from the first hand, as may be identified in the input received at step 46, is also replaced with a replacement card in the first hand. Cards that are not identified for removal from the first hand are held in the first hand and are not replaced.

In one embodiment, once a replacement card is introduced into the first hand to replace a shifted card, it is considered as held in the first hand and cannot be further shifted or discarded.

In one embodiment, once a replacement card is introduced into the first hand to replace a discarded card, it is considered as held in the first hand and cannot be further shifted or discarded.

In a variant embodiment, steps 46 and 48 may be repeated, thereby providing users with the ability to "draw" cards more than once.

At step 50, a payout is determined based on the cards in the first hand, after all replacements at step 48 have been made. The payout is determined by comparing the rank of the first hand with a payout associated with that rank, as would be typically identified in a payout table or scheme.

For example, if the user initiated play of a given hand by wagering $1, and the completed hand is determined to have a rank of "royal flush", the player could be awarded a prize of $2000, in accordance with one example payout scheme. Different payout schemes may be employed in variant implementations, which is typically based on the mathematical probabilities associated with attaining particular combinations, and which accounts for amounts to be withheld by an operator of the gaming device.

The completion of step 50 typically signifies the end of play of the hand for the current game instance from the user's perspective.

At step 52, a second hand is initially formed ("seeded") with cards to be shifted from the first hand as identified in the input received at step 46. If no cards to be shifted from the first hand were identified in the input received at step 46 in the current iteration, the second hand will not comprise any cards. Otherwise, in this embodiment, all of the cards to be shifted from the first hand as identified in the input received at step 46 will be used to form the second hand. In a variant embodiment, less than all of the cards to be shifted from the first hand as identified in the input received at step 46 may be used to form the second hand.

Optionally, cards used to form the second hand at step 52 may be displayed to the user as they are identified by the user and the corresponding input at step 46 has been received. This would allow the user to monitor which cards have been shifted to the second hand.

In one example user interface for a display, the images on the display of the gaming device can be modified to show poker hands shifting down, with at least one completed hand remaining displayed, while room is made for subsequent hands to be displayed. Additional information (e.g. relating to the current game state, credits remaining that may be wagered, etc.) may also be displayed to the user as needed.

At step 54, it is determined whether the second hand includes at least one card. If so, then a subsequent iteration of the steps of method 40 is performed, where a new hand comprising cards corresponding to those in the second hand formed at step 52 is provided as the first hand at step 44 of the subsequent iteration. Additional cards may also be dealt to the new hand depending on the number of cards that were shifted to the second hand, so that the new hand will comprise the predetermined number of cards associated with the variation of the game being played. Accordingly, a new, subsequent game instance is initiated with the shifted cards being used to seed the new hand for the new game instance.

In one embodiment, cards that have been shifted and used to seed the new hand for the new game instance may not be permitted to be shifted from the first hand or discarded, and are automatically considered to be held in the new hand. In that case, steps 46 and 48 of the subsequent iteration may only be performed with respect to the additional cards that are dealt to the new hand.

In one embodiment, cards of the new hand provided at step 44 of the subsequent iteration (and any replacement cards for those cards that may be employed at step 48 of the subsequent iteration) are provided from a deck different from the deck that provided the cards in the second hand formed at step 52 (of the most recently completed iteration) that were selected to be shifted from the first hand by the user. This will prevent duplicate cards from appearing in the same hand of the new game instance, which may confuse users.

In one embodiment, if the input received at step 46 identifies one or more cards to be shifted from the first hand to a second hand, the wager that would otherwise be collected at step 42 of a subsequent iteration to initiate play of a new hand may be collected in advance. For example, if the input received at step 46 identifies one or more cards to be shifted from the first hand to a second hand, the wager for the new hand must be collected before any replacements of the shifted cards are made, and before the second hand is formed in the current iteration of method 40, thereby committing the user to play the new hand. If the user is permitted to opt out of providing the advance wager, then the user will not be permitted to shift cards to the second hand if the advance wager is not provided, and consequently, the second hand would not be formed and the subsequent iteration of the steps of method 40 would not be performed in that case. In some implementations, the advance wager is collected automatically from available credits if one or more cards to be shifted from the first hand are identified. As users are committed to play the new hand with the advance wagers being collected, and since multiple iterations of method 40 may be performed so long as cards of the hand currently being played are selected by the user to be shifted from the first hand to a new hand, continuous play of the poker game is elicited and encouraged.

If at step 54, it is determined that the second hand does not include at least one card, then the flow of steps of method 40 proceeds to step 56, denoting the end of method 40.

Figure 3:
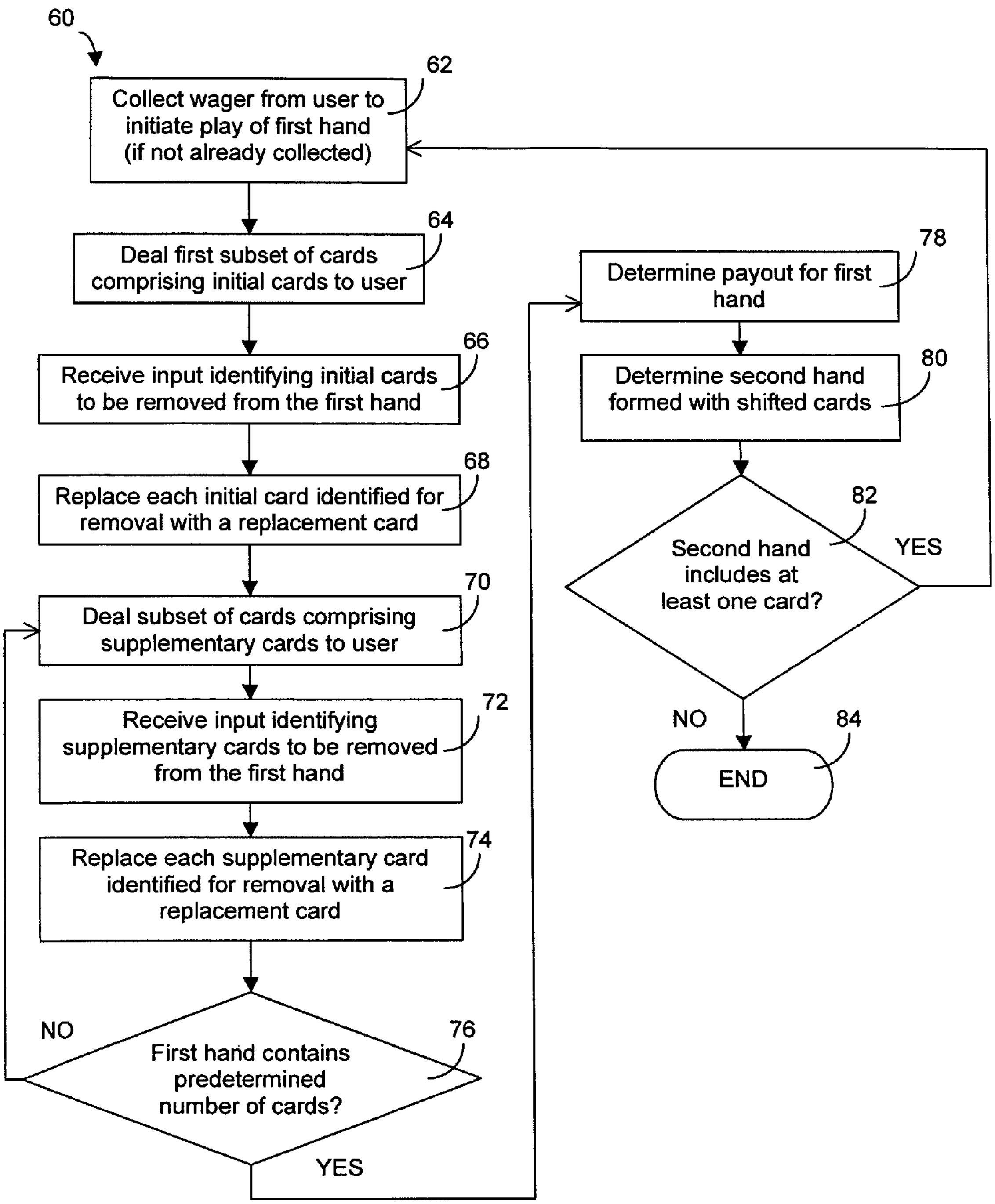
FIG. 3 is a flowchart illustrating steps of a method of providing a poker game in another embodiment.

Referring to FIG. 3, a flowchart illustrating steps of a method of providing a poker game in another embodiment is shown generally as 60.

Method 60 is similar in at least some respects to method 40 described with reference to FIG. 2, and certain variant embodiments of method 40 may also apply to method 60, in addition to those explicitly referenced below.

In method 60, the cards of the first hand are more specifically provided as a sequence of subsets of cards (e.g. five cards provided as a sequence of two initial cards followed by three individually-dealt supplementary cards). In a particular game instance, the user decides whether or not to shift each card of a given subset in the sequence before the next subset in the sequence is provided to the user.

As at least some of the cards in the first hand are not dealt to the user until after a decision of whether to remove (e.g. to shift and/or discard) at least some of the other cards in the first hand is made by the user, enhanced playability, suspense and attraction to the game may be provided.

In an iteration of method 60, which generally represents a single game instance of the poker game provided, method 60 may comprise some or all of steps 62 to 84 and any other steps relating to various embodiments of method 60 as described below.

At step 62, a wager provided by a user to initiate play of an instance of the poker game is collected from the user on the gaming device, as similarly described in step 42 of FIG. 2.

At step 64, a first hand of cards consisting of a subset of cards comprising initial cards is provided to the user. The number of initial cards provided would generally be less than the predetermined number of cards for a poker hand associated with the variation of the game being played. As similarly described in step 44 of FIG. 2, the cards of the first hand are dealt from a virtual deck of playing cards and are displayed to the user on a display of the gaming device (e.g. display 22 of gaming device 20 of FIGS. 1A to 1C).

While the first hand will eventually comprise the predetermined number of cards associated with the variation of the game being played upon completion of the current game instance, in this embodiment, only a subset of cards is initially dealt to the user. For example, two initial cards of a five-card poker hand may be dealt at step 64.

The subset of cards comprising initial cards that are displayed to the user at step 64 are considered by the user, who may select cards to be removed from the hand to be replaced with replacement cards, generally with a view to ultimately forming the highest ranking hand, after all of the cards of the hand are dealt and acted upon, with which a payout is associated as identified in a predetermined payout table.

For any given initial card in the first hand, the user may choose to discard the card, shift the card to a second hand (with the shifted card being removed from the first hand), or hold the card in the hand (i.e. "holding" the card).

In a variant embodiment, the user may only be provided with an option to shift one or more of the initial cards that the user does not wish to hold, and is not permitted to discard those initial cards. In another variant embodiment, the user may be permitted to only discard or hold one or more of the initial cards. In another variant embodiment, the user may not be permitted to shift or discard one or more of the initial cards.

At step 66, if the user wishes to remove at least one initial card in the subset provided to the user at step 64 from the first hand to be replaced by replacement cards, input identifying the initial cards for removal from the first hand dealt at step 64 as selected by the user is received. The input identifies the initial cards to be shifted from the first hand to a second hand. The input may also identify initial cards to be discarded from the first hand. The input may also explicitly identify cards to be held in the first hand, or alternatively, any cards not explicitly identified for removal from the first hand may be deemed to be held in the first hand.

At step 68, each initial card identified for removal from the first hand at step 66, if any, is replaced with a replacement card randomly drawn from the deck in the first hand. In particular, each initial card to be shifted from the first hand as identified in the input received at step 66 is replaced with a replacement card in the first hand. Each initial card to be discarded from the first hand, as may be identified in the input received at step 66 is also replaced with a replacement card in the first hand. Initial cards that are not identified for removal from the first hand are held in the hand and are not replaced.

In one embodiment, once a replacement card is introduced into the first hand to replace a shifted initial card, it is considered as held in the first hand and cannot be further shifted or discarded.

In one embodiment, once a replacement card is introduced into the first hand to replace a discarded initial card, it is considered as held in the first hand and cannot be further shifted or discarded.

At step 70, the first hand is provided with a further subset of cards comprising one or more supplementary cards to the user. This further subset comprising supplementary cards is dealt from the same deck that provided the initial cards that were dealt to the user at step 64.

In one embodiment, this further subset may comprise exactly one card. For example, the third card of a five-card poker hand may be dealt at the first performance of step 70. As step 70 is repeated, this may facilitate the dealing of supplementary cards on an individual basis, which may be desired to increase suspense and attraction to the game.

Each of the supplementary cards displayed to the user at step 70 is considered by the user, who may choose to discard the supplementary card, shift the supplementary card to a second hand (with the shifted card being removed from the first hand), or hold the supplementary card in the hand.

In a variant embodiment, the user may only be provided with an option to shift one or more of the supplementary cards that the user does not wish to hold, and is not permitted to discard those supplementary cards. In another variant embodiment, the user may be permitted to only discard or hold one or more of the supplementary cards. In another variant embodiment, the user may not be permitted to shift or discard one or more of the supplementary cards.

At step 72, if the user wishes to remove at least one supplementary card in the subset provided to the user at step 70 from the first hand to be replaced by replacement cards, additional input identifying the supplementary cards for removal from the first hand as selected by the user is received. The additional input identifies the supplementary cards to be shifted from the first hand to a second hand. The additional input may also identify supplementary cards to be discarded from the first hand. Any supplementary cards not selected to be shifted from the first hand or discarded are deemed to be held in the first hand.

At step 74, each supplementary card identified for removal from the first hand at step 72, if any, is replaced with a replacement card randomly drawn from the deck in the first hand. More specifically, each supplementary card to be shifted from the first hand as identified in the additional input received at step 72 is replaced with a replacement card in the first hand. Each supplementary card to be discarded from the first hand, as may be identified in the additional input received at step 72 is also replaced with a replacement card in the first hand. Supplementary cards that are not identified for removal from the first hand are held in the first hand and are not replaced.

As noted above, in one embodiment of method 60, once a replacement card is introduced into the first hand to replace a shifted initial card, it is considered as held in the first hand and cannot be further shifted or discarded. Moreover, in one embodiment of method 60, once a replacement card is introduced into the first hand to replace a discarded initial card, it is considered as held in the first hand and cannot be further shifted or discarded.

At step 76, a determination is made as to whether the first hand contains the predetermined number of cards for a poker hand associated with the variation of the game being played. If not, then the flow of steps of method 60 proceeds back to step 70 where the first hand is provided with an additional subset of cards comprising supplementary cards. For example, steps 70 to 74 may be repeated three times, with each iteration providing exactly one supplementary card to the first hand, which when combined with two initial cards previously dealt, will form a five-card poker hand.

It will be understood that the number of initial cards in the subset dealt at step 64 and the number of supplementary cards dealt in each subset at step 70 may differ in variant implementations. It will also be understood that the number of supplementary cards dealt in a subset at step 70 in one iteration of steps 70 to 74 may vary between iterations of steps 70 to 74. For example, in one given iteration of steps 70 to 74, a subset consisting of exactly one card may be dealt at step 70, while in another iteration of the same steps, a subset consisting of more than one card may be dealt at step 70.

At step 78, with the first hand containing the predetermined number of cards and all replacements at step 74 (which may have been repeated) having been made, a payout is determined based on the cards in the first hand. As noted at step 50 of method 40, the payout is determined by comparing the rank of the first hand with a payout associated with that rank as identified in a payout table or scheme. The completion of this step typically signifies the end of play of the hand for the current game instance from the user's perspective.

At step 80, a second hand is initially formed with initial cards to be shifted from the first hand as identified in the input received at step 66 and with supplementary cards to be shifted from the first hand as identified in the additional input received at step 72 (which may have been repeated). If no cards to be shifted from the first hand were identified in the input received at step 66 and no cards to be shifted from the first hand were identified in the additional input received at step 72, the second hand will not comprise any cards. Otherwise, in this embodiment, all of the cards to be shifted from the first hand as identified in the combined input received at steps 66 and 72 will be used to form the second hand. In a variant embodiment, less than all of the cards to be shifted from the first hand as identified in the combined input may be used to form the second hand.

As similarly described in method 40, optionally in method 60, cards used to form the second hand at step 80 may be displayed to the user as they are identified by the user and the corresponding input at step 66 or 72 has been received. This would allow the user to monitor which cards have been shifted to the second hand.

At step 82, it is determined whether the second hand includes at least one card. If so, then a subsequent iteration of the steps of method 60 is performed, where a new hand comprising cards corresponding to those in the second hand formed at step 80 is provided as the initial cards of the first hand at step 64 of the subsequent iteration. Accordingly, a new, subsequent game instance is initiated with the shifted cards being used to seed the new hand for the new game instance.

In one embodiment, if the number of cards in the second hand is less than the number of initial cards that would otherwise normally be provided at step 64 in a new game instance had no cards been shifted to it from previous hands, additional cards may also be dealt to the new hand to "top-up" the number of initial cards in the hand dealt at step 64 in the subsequent iteration.

As similarly described in method 40, in one embodiment of method 60, cards that have been shifted and used to seed the new hand for the new game instance as initial cards may not be permitted to be shifted from the first hand or discarded, and are automatically considered to be held in the new hand. In that case, steps 66 and 68 of the subsequent iteration may only be performed with respect to the additional cards that are dealt as initial cards to the new hand.

As similarly described in method 40, in one embodiment of method 60, cards of the new hand provided at step 64 of the subsequent iteration (and any replacement cards for those cards that may be employed at steps 68 or 74 of the subsequent iteration) are provided from a deck different from the deck that provided the cards in the second hand formed at step 80 (of the most recently completed iteration) that were selected to be shifted from the first hand by the user. This will prevent duplicate cards from appearing in the same hand of the new game instance, which may confuse users.

As similarly described in method 40, in one embodiment of method 60, if the input received at step 66 identifies one or more initial cards to be shifted from the first hand to a second hand, the wager that would otherwise be collected at step 62 of a subsequent iteration to initiate play of a new hand may be collected in advance. For example, if the input received at step 66 identifies one or more initial cards to be shifted from the first hand to a second hand, the wager for the new hand must be collected before any replacements of the shifted initial cards are made, and before the second hand is formed in the current iteration of method 60 with the shifted initial cards, thereby committing the user to play the new hand. Once the advance wager is collected, supplementary cards may also be subsequently shifted to the new hand. If the user is permitted to opt out of providing the advance wager, then the user will not be permitted to shift any cards to the second hand if the advance wager is not provided, and consequently, the second hand would not be formed with shifted cards. In some implementations, the advance wager is collected automatically from available credits if one or more cards to be shifted from the first hand are identified.

If the input received at step 66 does not identify one or more initial cards to be shifted from the first hand to a second hand, but an additional input received at step 72 does identify one or more supplementary cards to be shifted from the first hand to a second hand, then the wager that would otherwise be collected at step 62 of a subsequent iteration to initiate play of a new hand may be collected in advance, before any replacements of the shifted supplementary cards are made and before the second hand is formed in the current iteration of method 60 with the shifted supplementary cards. Once the advance wager is collected, further supplementary cards may also be subsequently shifted to the new hand. As noted from the foregoing, if the user is permitted to opt out of providing the advance wager, then the user will not be permitted to shift any cards to the second hand if the advance wager is not provided when required, and consequently, the second hand would not be formed with shifted cards. A subsequent iteration of the steps of method 60 would not be formed if the second hand does not contain any shifted cards.

As users are committed to play the new hand with the advance wagers being collected, and since multiple iterations of method 60 may be performed so long as cards of the hand currently being played are selected by the user to be shifted from the first hand to a new hand, continuous play of the poker game is elicited and encouraged.

If at step 82, it is determined that the second hand does not include at least one card, then the flow of steps of method 60 proceeds to step 84, denoting the end of method 60.

Referring to FIGS. 4A to 4E, example screenshots of a display of a gaming device on which a poker game in one embodiment is provided are shown.

In this example, cards are displayed to a user ("player") on a display of a gaming device (e.g. display 22 of gaming device 20 of FIGS. 1A to 1C). The gaming device may be, for example, a video terminal or a personal computing device. Other examples of gaming devices were described with reference to FIGS. 1A to 1C.

Figure 4A:
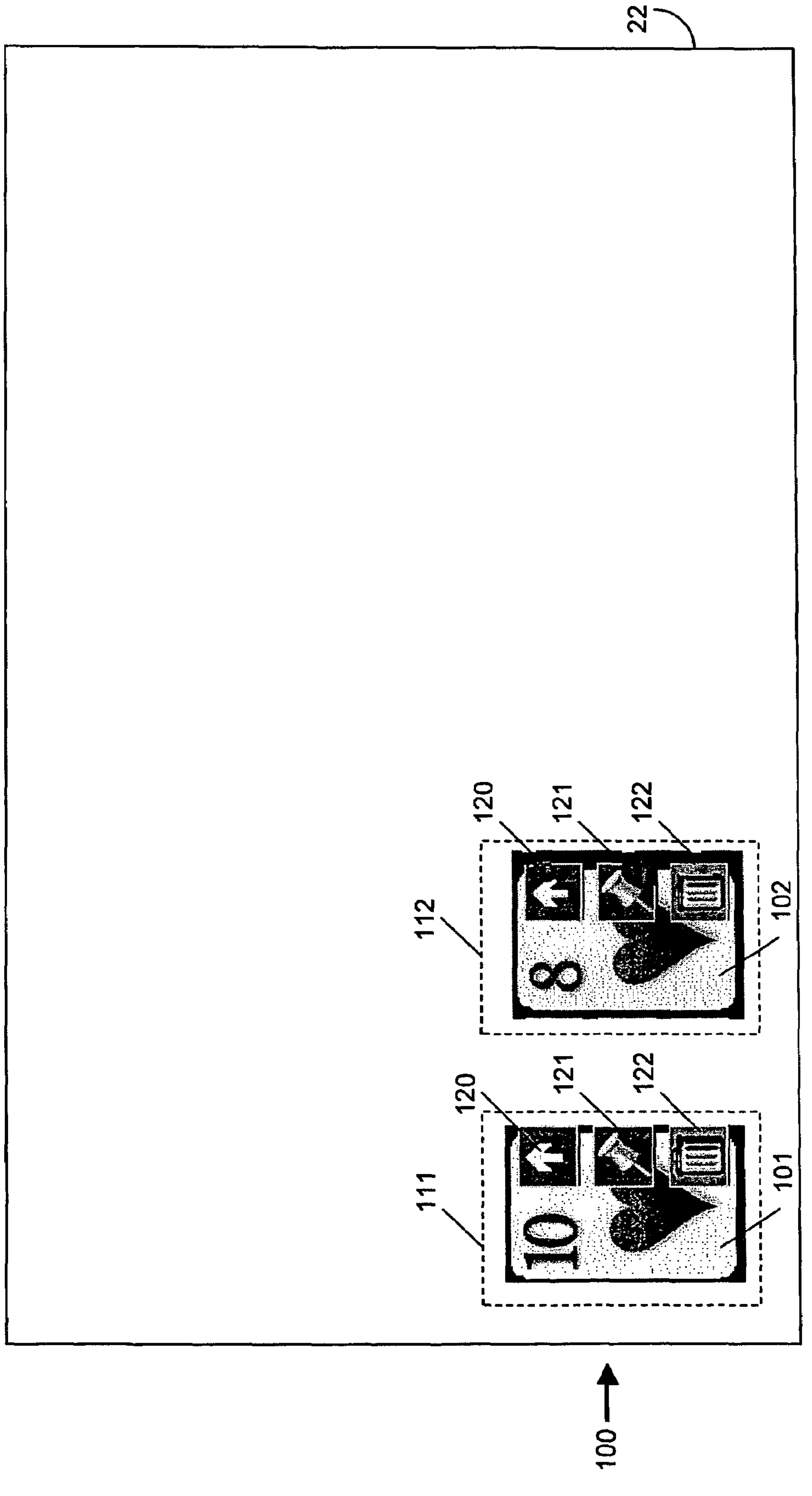
FIGS. 4A-4E are example screenshots of a display of a gaming device on which a poker game in one embodiment is provided.

FIG. 4A shows a state of an example game instance in a display 22. The player has been dealt a first subset in a sequence of cards for a first hand 100, where the subset comprises two initial cards 101, 102, representing a starting hand. In the example game instance shown, the player has received the ten of hearts 101 displayed in a first card position 111, and the eight of hearts 102 displayed in a second card position 112.

For each initial card 101, 102, the player is provided with the option of performing any one of three actions, as indicated by the icons or buttons 120, 121, 122 associated with each card. The first option represents the action of shifting a card from the currently active first hand 100 into an inactive second hand (not shown in FIG. 4A), and can be exercised by the user by selecting the shift button 120 associated with the card to be shifted from the first hand 100. The second option represents the action of holding a card in the currently active first hand 100, and can be exercised by the user by selecting the hold button 121 associated with the card to be held in the first hand 100. The third option represents the action of discarding a card from the currently active first hand 100, and can be exercised by the user by selecting the discard button 122 associated with the card to be discarded from the first hand 100. The player can make the selection on a gaming device using, for example, a touch screen by simply touching the desired button, a device such as a mouse or a trackball for moving a cursor and selecting the desired button, buttons physically provided on a gaming machine, or some other selection means.

Figure 4B:
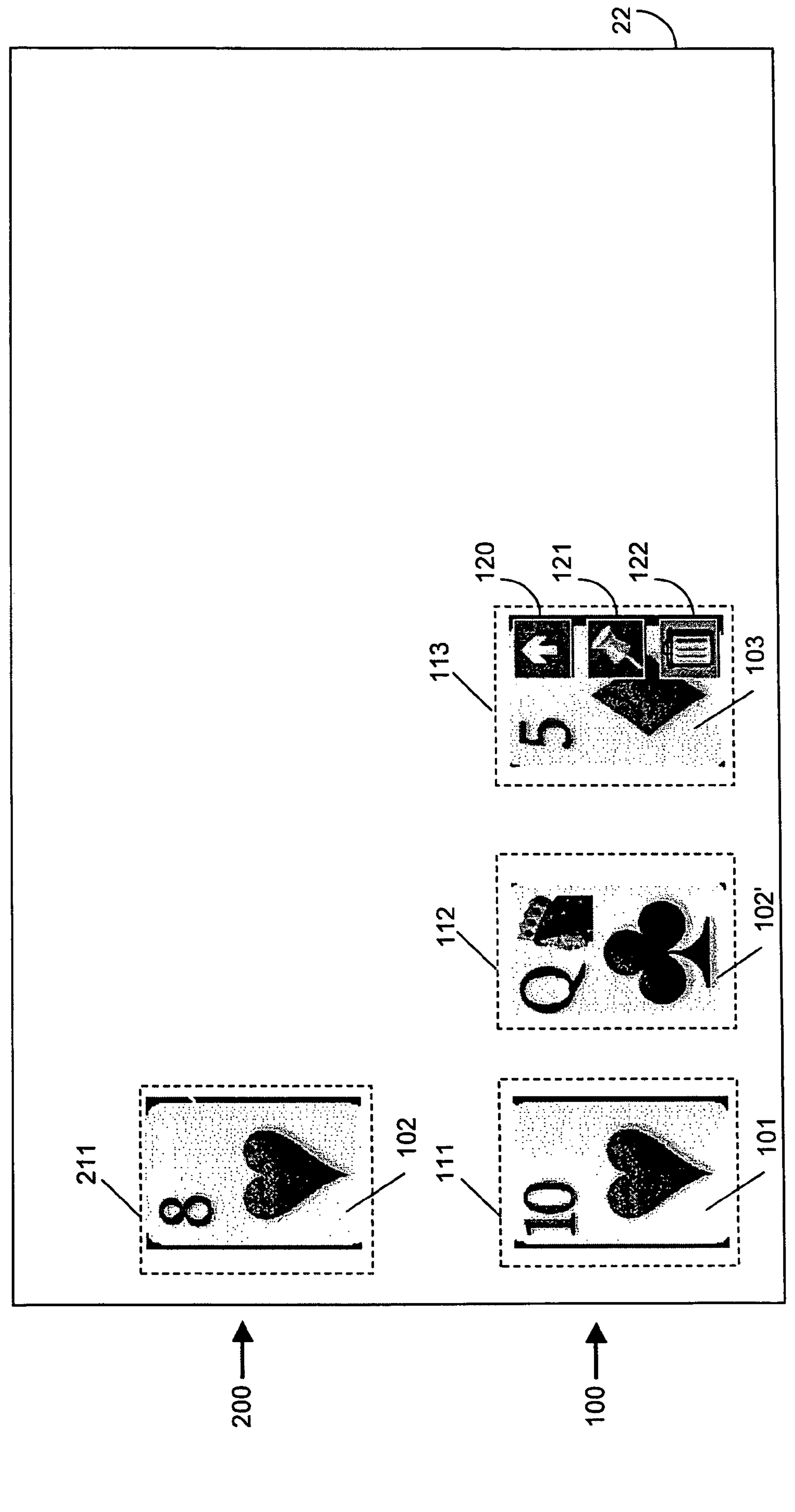

FIG. 4B shows a further state of the game instance following that shown in FIG. 4A, after an option in respect of each of initial cards 101, 102 has been exercised by the user, and the next subset in the sequence for first hand 100 is provided. In this example game instance, the player decided to hold the ten of hearts 101 in first hand 100 by selecting the hold button 121 associated with that card, and accordingly, the ten of hearts 101 is now fixed in the first card position 111. The player also decided to shift the eight of hearts 102 from first hand 100 to a second hand 200 by selecting the shift button 120 associated with that card, and the eight of hearts 102 is shown in the first card position 211 of the second hand 200. A random replacement card drawn from a playing card deck (not shown) associated with first hand 100, which in this example is the queen of clubs 102', replaces the shifted eight of hearts 102 in the second card position 112 of first hand 100. In this example, replacement cards can neither be shifted nor discarded.

As a card was shifted into a newly-formed second hand 200, a wager to play second hand 200 may be collected in advance from the player, even though actual play of second hand 200 is deferred until play of first hand 100 is completed.

As there were no more decisions left to be carried out by the player on the initial cards 101, 102, a new random card, the five of diamonds 103, was dealt into a third card position 113 of first hand 100 to continue play. The player can now exercise the same three options with respect to the five of diamonds 103: shift, hold, or discard the card, as represented by the icons 120, 121, and 122 respectively.

Figure 4C:
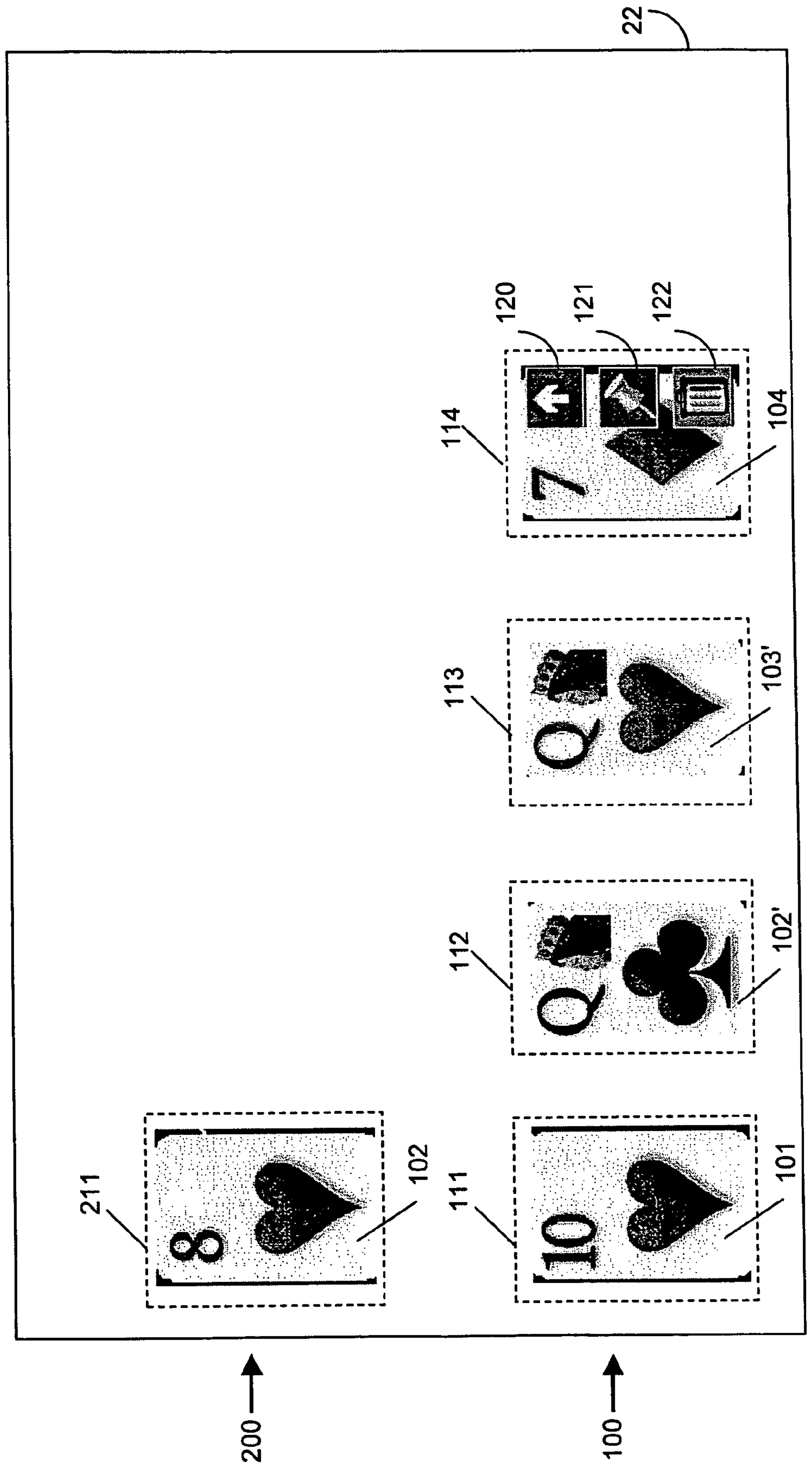

FIG. 4C shows a further state of the game instance following that shown in FIG. 4B, after an option in respect of the third card 103 (FIG. 4B) in the first hand 100 has been exercised by the user, and the next subset in the sequence for first hand 100 is provided. In this example game instance, the player decided to discard the five of diamonds 103 (FIG. 4B) from first hand 100 by selecting the discard button 122 associated with that card. A random replacement card drawn from the playing card deck associated with first hand 100, which in this example is the queen of hearts 103', replaces the discarded five of diamonds 103 (FIG. 4B) in the third card position 113 of first hand 100.

As there were no more decisions left to be carried out by the player on the cards shown in FIG. 4B, a new random card, the seven of diamonds 104, was dealt into a fourth card position 114 of first hand 100 to continue play. The player can now exercise the same three options with respect to the seven of diamonds 104: shift, hold, or discard the card, as represented by the icons 120, 121, and 122 respectively.

Figure 4D:
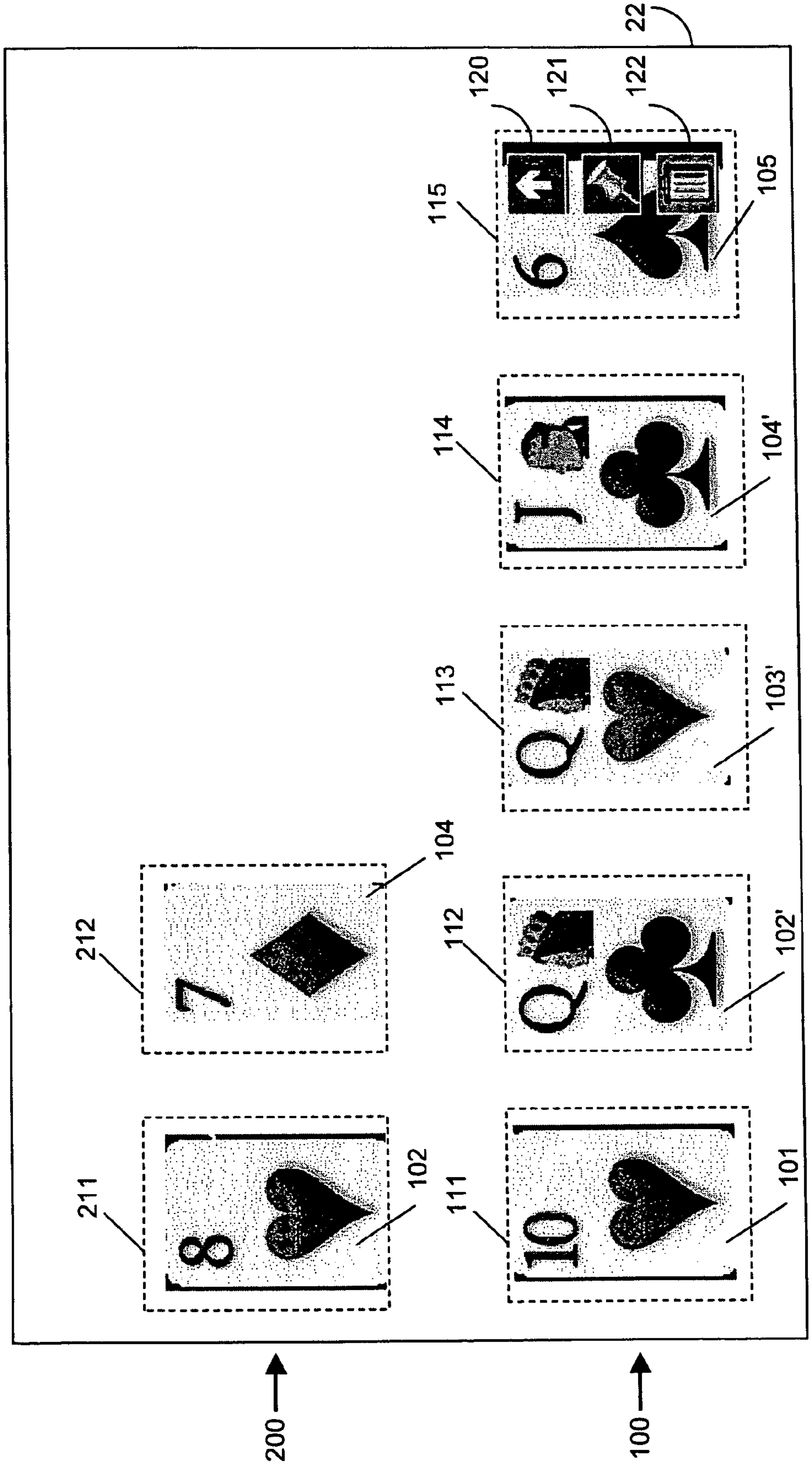

FIG. 4D shows a further state of the game instance following that shown in FIG. 4C, after an option in respect of the fourth card 104 in the first hand 100 has been exercised by the user, and the next subset in the sequence for first hand 100 is provided. In this example game instance, the player decided to shift the seven of diamonds 104 from first hand 100 to second hand 200 by selecting the shift button 120 associated with that card, and the shifted seven of diamonds 104 is shown in the second card position 212 of the second hand 200. A random replacement card drawn from the playing card deck associated with first hand 100, which in this example is the jack of clubs 104', replaces the shifted seven of diamonds 104 in the fourth card position 114 of first hand 100.

As there were no more decisions left to be carried out by the player on the cards shown in FIG. 4C, a new random card, the six of spades 105, was dealt into a fifth card position 115 of first hand 100 to continue play. The player can now exercise the same three options with respect to the six of spades 105: shift, hold, or discard the card, as represented by the icons 120, 121, and 122 respectively.

Figure 4E:
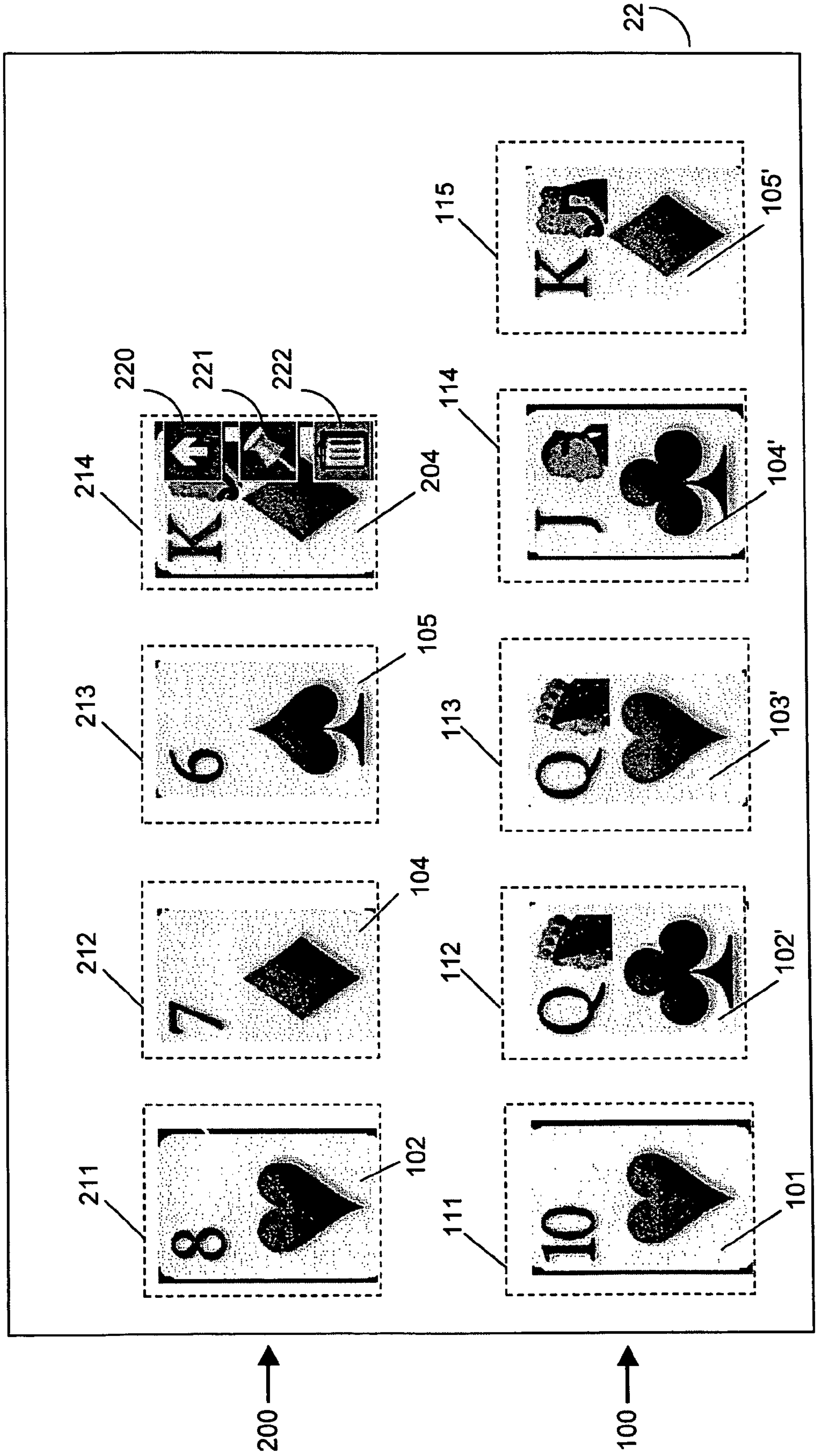

FIG. 4E shows a further state of the game instance following that shown in FIG. 4D, after an option in respect of the fifth card 105 in the first hand 100 has been exercised by the user. In the game for which this example game instance is provided, only five cards are dealt for a given poker hand. In this example game instance, the player decided to shift the six of spades 105 from first hand 100 to second hand 200 by selecting the shift button 120 associated with that card, and the six of spades 105 is shown in the third card position 213 of the second hand 200. A random replacement card drawn from the playing card deck associated with first hand 100, which in this example is the king of diamonds 105', replaces the shifted six of spades 105 in the fifth card position 115 of first hand 100.

As there were no more decisions left to be carried out by the player on the five cards of first hand 100, a payout is determined for the first hand 100 and awarded to the player. In this example, depending on the applicable payout table, the player may be awarded with a payout associated with the rank of one pair of queens. This signifies the end of play on the first hand 100 from the user's perspective.

Play of a new game instance associated with second hand 200 is automatically commenced, and cards in the second hand 200 now become part of the new, currently active hand 200.

In this example, cards of hand 200 are provided from a second deck that is different from the deck that provided the cards for hand 100. Accordingly, cards from the second deck corresponding to shifted cards 102, 104, and 105 are eliminated from the second deck to avoid potential duplicate cards being dealt to hand 200. However, in variant embodiments, shifted cards may not be eliminated from the second deck if the dealing of duplicate cards to the same hand is permitted.

In other variant embodiments, multiple decks, or one continuous deck or an infinite deck could be used, or any other variation as may be known to those skilled in the art.

Furthermore, in this example, cards shifted to the currently active hand from a previously played hand (e.g. 102, 104, 105 in hand 200) may not be further shifted or discarded, and must be held. However, in variant embodiments, the user may be provided with the options of shifting, holding, or discarding one or more of these cards.

In the example new game instance shown in FIG. 4E, a new random card, the king of diamonds 204, was dealt into a fourth card position 214 of the new hand 200 to continue play. The player can now exercise three options with respect to the king of diamonds 204: shift, hold, or discard the card, as represented by the icons 220, 221, and 222 respectively. Should the player choose to shift the king of diamonds 204, it may be shifted from hand 200 to a subsequent new hand (not shown) that, in this example, would not become active until the completion of play of hand 200, possibly pending the collection of an additional wager. Accordingly, continuous play is elicited and encouraged.

In this example, the king of diamonds 204 was dealt into the fourth card position 214. This card appears in both hand 100 and hand 200. In this example, a separate deck was used to provide cards for hand 100 and hand 200, and cards may be duplicated from one hand to the next. However, as noted above, the use of separate decks for separate hands, while providing certain advantages, is not an essential requirement.

The screenshots shown in FIGS. 4A to 4E are provided by way of example only, and illustrate a particular game instance in an implementation of only one exemplary embodiment in one example user interface.

In variant embodiments, certain predetermined cards and/or certain cards in predetermined positions that are provided in a hand or in a subset therefor may not be permitted to be shifted and/or discarded by a user. For example, one or more initial cards, once dealt to a hand (even where the card has not been shifted from a previous hand) may be required to be held by a user. As a further example, the last card dealt to a given hand (e.g. the fifth card of a five-card hand) may be required to be held by a user.

Other variations in which not all of the options of shifting, discarding or holding a given card in a hand will be permitted to be exercised by a user are possible.

In embodiments where cards that are shifted into a hand (i.e. from a hand played in a previous game instance) may not be further shifted or discarded from that hand, and in the event that the hand already contains the predetermined number of cards permitted and is comprised solely of shifted cards, a payout may be automatically determined and the game instance terminated.

In variant embodiments, cards of one hand may be shifted from the hand to more than one second hand. In some of these variant embodiments, the same card may be duplicated when shifted to multiple second hands. In some other of these variant embodiments, multiple cards to be shifted may be distributed across several second hands.

In variant embodiments, cards may have been shifted into a given hand from a plurality of previous hands, each of the plurality of previous hands having been played in a previous game instance.

In at least some of the embodiments described above, the second hand to be played in a subsequent iteration remains inactive until play on the first hand is completed. However, in variant embodiments, both the first and second hands may be active simultaneously, and cards may be shifted and discarded from either active hand at any given time. Furthermore, in variant embodiments, more than two hands may be active at any one time. In variant embodiments, cards may be shifted not only to a hand associated with a subsequent game instance, but also to a hand associated with any game instance that is still active.

In at least some of the embodiments described above, once a card is shifted from a hand, it is automatically discarded from the hand and replaced with a replacement card. In variant embodiments, however, a card that is shifted may also be permitted to remain in the hand and not be replaced with a replacement card. This may be at the option of the user, or may be enforced automatically.

In a variant embodiment, additional wagers may be collected from players on a card-by-card basis. In one such variation, the player "buys" the option to shift a given card.

In another broad aspect of the invention, there is provided a gaming device comprising at least a processor and a display, where the processor executes instructions for performing one or more of the embodiments of the methods described above.

Instructions for performing a method of providing a poker game in accordance with embodiments of the invention may be provided on computer-readable media, which is intended to encompass transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of providing a poker game for play on a gaming device, wherein hands are provided with cards that are displayed to a user on a display of the gaming device, wherein the method comprises:

a) dealing a plurality of cards, wherein the plurality of cards define at least a portion of a first hand;

b) receiving input from the user, wherein the input identifies zero or more of the plurality of cards to be shifted from the first hand to a second hand having no cards therein at the time the input is received;

c) if one or more cards have been shifted from the first hand, replacing each card shifted from the first hand with a replacement card;

d) determining a payout based on the first hand after completion of the replacing step;

e) if one or more cards have been shifted from the first hand, dealing at least one dealt card into the second hand, wherein the second hand comprises the at least one dealt card and the one or more cards shifted from the first hand; and f) repeating steps (b) to (e), wherein the second hand becomes the first hand.

2. The method of claim 1, wherein the plurality of cards are dealt to the first hand as a sequence of at least one subset of cards, each subset comprising one or more cards, wherein input is received from the user for each subset in the sequence at the receiving step, and wherein any subset in the sequence is dealt to the user after input is received for the preceding subset.

3. The method of claim 1, wherein the cards dealt to each of the first and second hands are dealt from a different card deck.

4. The method of claim 1, further comprising the steps of:

collecting a first wager from the user to initiate play of the first hand; and collecting a second wager from the user to play the second hand prior to dealing the at least one card into the second hand.

5. The method of claim 4, further comprising requesting user authorization prior to collecting the second wager.

6. The method of claim 1, wherein the input received at the receiving step further identifies zero or more cards to be discarded from the first hand and wherein at the replacing step, each card to be discarded from the first hand is also replaced with a replacement card.

7. The method of claim 1, wherein the input received at the receiving step further identifies zero or more cards to be held in the first hand, and wherein at the replacing step, each card to be held in the first hand is not replaced with a replacement card in the first hand.

8. The method of claim 1, further comprising dealing a third hand, wherein the third hand comprises cards shifted from the first hand and the second hand.

9. A computer-readable medium comprising instructions for execution of a method of providing a poker game for play on a gaming device, wherein hands are provided with cards that are displayed to a user on a display of the gaming device, the method comprising:

a) dealing a plurality of cards, wherein the plurality of cards define at least a portion of a first hand;

b) receiving input from the user, wherein the input identifies zero or more of the plurality of cards to be shifted from the first hand to a second hand having no cards therein at the time the input is received;

c) if one or more cards have been shifted from the first hand, replacing each card shifted from the first hand with a replacement card;

d) determining a payout based on the first hand after completion of the replacing step;

e) if one or more cards have been shifted from the first hand, dealing at least one dealt card into the second hand, wherein the second hand comprises the at least one dealt card and the one or more cards shifted from the first hand; and f) repeating steps (b) to (e), wherein the second hand becomes the first hand.

10. A gaming device for playing a poker game comprising:

a) a processor;

b) a display adapted for communication with the processor; and c) an input device adapted for communication with the processor;

wherein:

(i) the processor is adapted to instruct the display to display a plurality of cards, wherein the plurality of cards define at least a portion of a first hand;

(ii) the input device is adapted to receive from the user a selection identifying zero or more of the plurality of cards to be shifted from the first hand to a second hand having no cards therein at the time the input is received;

(iii) if one or more cards have been shifted from the first hand, the processor is adapted to instruct the display to replace each card shifted from the first hand with a replacement card;

(iv) the processor is adapted to determine a payout based on the first hand;

(v) if one or more cards have been shifted from the first hand, the processor is adapted to instruct the display to deal at least one dealt card into the second hand, wherein the second hand comprises the at least one dealt card and the one or more cards shifted from the first hand; and (vi) wherein the processor is adapted to repeat (ii) to (v), wherein the second hand becomes the first hand.

11. The method of claim 1, further comprising dealing a third hand, wherein the third hand comprises at least one card shifted from the second hand, wherein the at least one card shifted from the second hand excludes cards shifted to the second hand from the first hand.

* * * * *